United States Patent [19]

Ohyama et al.

[11] Patent Number: 5,180,909
[45] Date of Patent: Jan. 19, 1993

[54] OPTICAL PICKUP USING DIFFRACTED LIGHT

[75] Inventors: Minoru Ohyama, Sagamihara; Tetsuhiro Yamazaki, Yokohama; Hiroshi Inoue, Yokosuka; Toshio Konno, Hoya, all of Japan

[73] Assignee: Victor Company of Japan, Ltd., Yokohama, Japan

[21] Appl. No.: 691,963

[22] Filed: Apr. 26, 1991

[30] Foreign Application Priority Data

Apr. 27, 1990 [JP] Japan .................. 2-112941

[51] Int. Cl.$^5$ ................ H01J 3/14; G01J 1/20; G11B 7/00
[52] U.S. Cl. ................ 250/216; 250/201.5; 369/44.12
[58] Field of Search ........... 250/201.5, 237 G, 216; 369/44.12, 44.41; 359/571, 575; 357/19

[56] References Cited

U.S. PATENT DOCUMENTS

| | | | |
|---|---|---|---|
| 3,913,076 | 10/1975 | Lehureau et al. | 340/173 |
| 4,718,052 | 1/1988 | Kondo et al. | 379/44.12 |
| 4,945,525 | 7/1990 | Yamamoto et al. | 369/44.12 |
| 5,049,732 | 9/1991 | Nagahama et al. | 250/201.5 |

FOREIGN PATENT DOCUMENTS 0269237 11/1986 Japan .................. 369/44.12
61-296540 12/1986 Japan .

OTHER PUBLICATIONS

G. Bouwhuis et al. "Principles of Optical Disc Systems", pp. 8 to 23 and 73 (partial translation) 1985.

Primary Examiner—David C. Nelms
Assistant Examiner—Michael Messinger
Attorney, Agent, or Firm—Jacobson, Price, Holman & Stern

[57] ABSTRACT

There is provided an optical pickup which emits a reading light to an optical disc having a pit in which information is stored and reads the information by means of the 0th order reflected light reflected from the pit and the diffracted light generated on the pit by diffraction effect. The optical pickup comprises a semiconductor laser for generating the reading light, a first photodiode for generatign a first electric signal corresponding to the intensity of the 0th order reflected light incident thereto, a second photodiode for generating a second electric signal corresponding to the intensity of the diffracted light incident thereto, a light focusing and guiding device for focusing the reading light to the pit and guiding the 0th order reflected light to the first photodiode, a light guiding device for guiding the diffracted light to the second photodiode and an operation device for generating an output signal by taking difference between the first and the second electric signals.

4 Claims, 9 Drawing Sheets

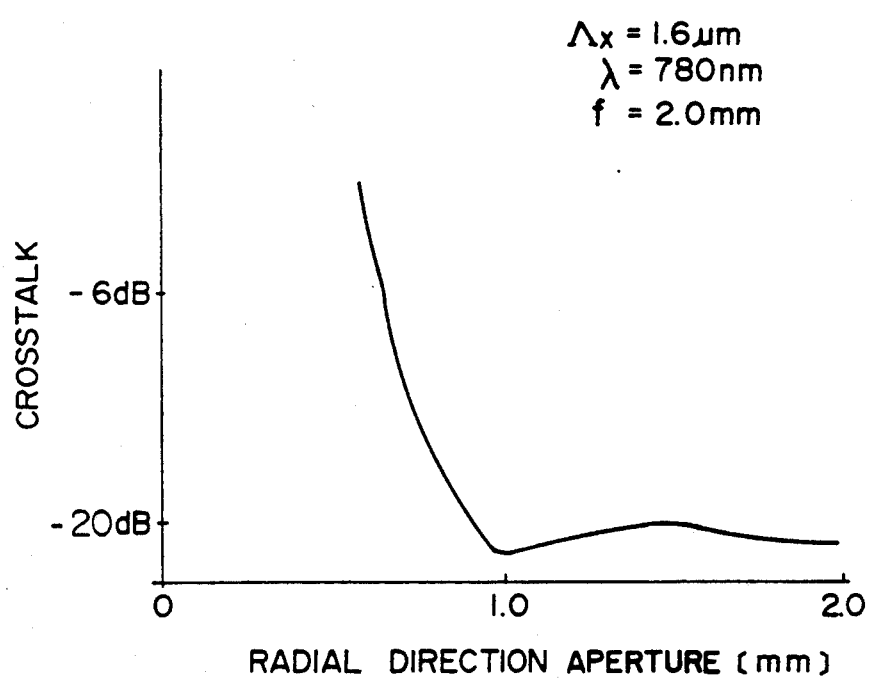
F I G. 10

OPTICAL PICKUP USING DIFFRACTED LIGHT

BACKGROUND OF THE INVENTION

The present invention relates to a optical pickup for optical recording and information read in a CD (compact disc) player and the like, and in particular, to an integrated optical pickup using an optical waveguide.

FIG. 1 is a figure showing the principle (central aperture method) for read of an optical disc using a conventional optical pickup.

As shown in the figure, a light that is emitted from a semiconductor laser 11 passes through a half mirror 12 and links a spot on an optical disc 14 by a (objective) lens 13. When the spot strikes a pit, there is diffraction by the pit and the 0th-order light that is reflected by the optical disc 14 returns as it is to the aperture of the lens 13 but the ±1st order diffracted lights are phase shifted in proportional to the depth d of the pit, and return to offset regions 16, 17 from the aperture of the lens 13. Because of this, at the lens aperture, there is interference by the portion of the 0th-order light and the ±1st order diffracted light that overlap, and there is a drop in the intensity because of the phase difference between them. This description is for the case where the spot is on the pit but in cases when there is no pit and the spot is on a mirror surface of the optical disc 14, there is practically no diffracted light and the intensity of the light reflected to the lens 13 is unchanged. In both cases however, the reflected light that enters the lens aperture is reflected by the half mirror 12 and focuses on a photodiode 15. However, since as has been described above, there is a change in the intensity of the reflected light in the lens aperture because of the presence or absence of a pit and so an electrical signal corresponding to that intensity change is obtained as the photodiode output.

In addition, FIG. 2 is a diagram showing an example of a conventional integrated optical pickup. To FIG. 1, the objective lens 13 is replaced with a focusing grating coupler 13A, and the half mirror 12 is replaced with a grating beam splitter 12A. A light guiding layer 20 is formed on a semiconductor substrate 19. The principle of reading is the same as that shown in FIG. 1.

There are the following problems in the conventional optical pickup. Signal detection by a conventional optical pickup does not use the portion of the ±1 diffracted lights which do not enter the lens aperture, and the availability of the reflected light decreases.

With signal detection by the conventional optical pickup, a pit on the disc is detected as the signal which is the sum of the outputs of a plural number of photodiodes and so it is not possible to remove the common-mode optical and electrical noise in the same phase and this results in a poor signal-to-noise ratio.

In order to eliminate this problem, there has been proposed in U.S. Pat. No. 3,913,076 a method that detects the 0th order light and the diffracted light separately and takes the difference of the two to detect pits. With this method, there are sensors for the respective detection of the 0th order light and the diffracted light disposed on the inside of the far field of the read light and so there are many restrictions due to the shape of the sensors and their position of placement, and in reality, there is the problem that there is little design freedom with respect to the configuration of the optical pickup.

SUMMARY OF THE INVENTION

In order to eliminate this problem, the present invention provides an optical apparatus which emits a reading light to an optical information recording medium having a pit in which information is stored and reads the information by means of the 0th-order reflected light reflected from the pit and the diffracted light generated on the pit by diffraction effect.

The optical apparatus comprises light generation means for generating the reading light, first photoelectric conversion means provided so that the 0th-order reflected light is incident thereto for generating a first electric signal corresponding to the intensity of the 0th-order reflected light incident thereto, second photoelectric conversion means provided so that the diffracted light is incident thereto for generating a second electric signal corresponding to the intensity of the diffracted light incident thereto, light focusing and guiding means for focusing the reading light to the pit and guiding the 0th-order diffracted light reflected from the pit to the first photoelectric conversion means, light guiding means for guiding the diffracted light generated on the pit to the second photoelectric conversion means and operation means for generating an output signal by taking difference between the first and the second electric signals.

With an optical pickup having the configuration described above, the 0th order reflected light and the diffracted light from the optical information recording medium are respectively detected by the first and second photoelectric conversion means, and the information is read from that differential portion. According to the optical pickup of the present invention as has been described above, it is possible to efficiently obtain the output signal with a high signal-to-noise ratio, and to allow the elements to be made more compact.

BRIEF DESCRIPTION OF THE DRAWINGS

FIG. 10 is a diagram showing the characteristics of an optical pickup according to the present invention.

DETAILED DESCRIPTION OF THE PREFERRED EMBODIMENTS

The following is a description of embodiments of the optical pickup according to the present invention, with reference to the appended drawings.

Figure 1:
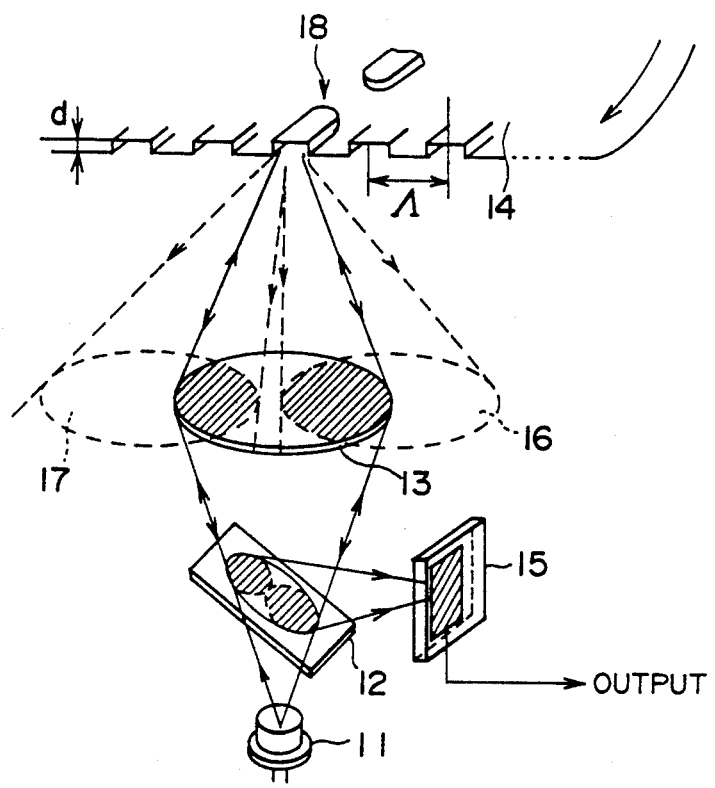
FIG. 1 is a view showing the principle of read of the pit information by a conventional optical pickup.
Figure 2:
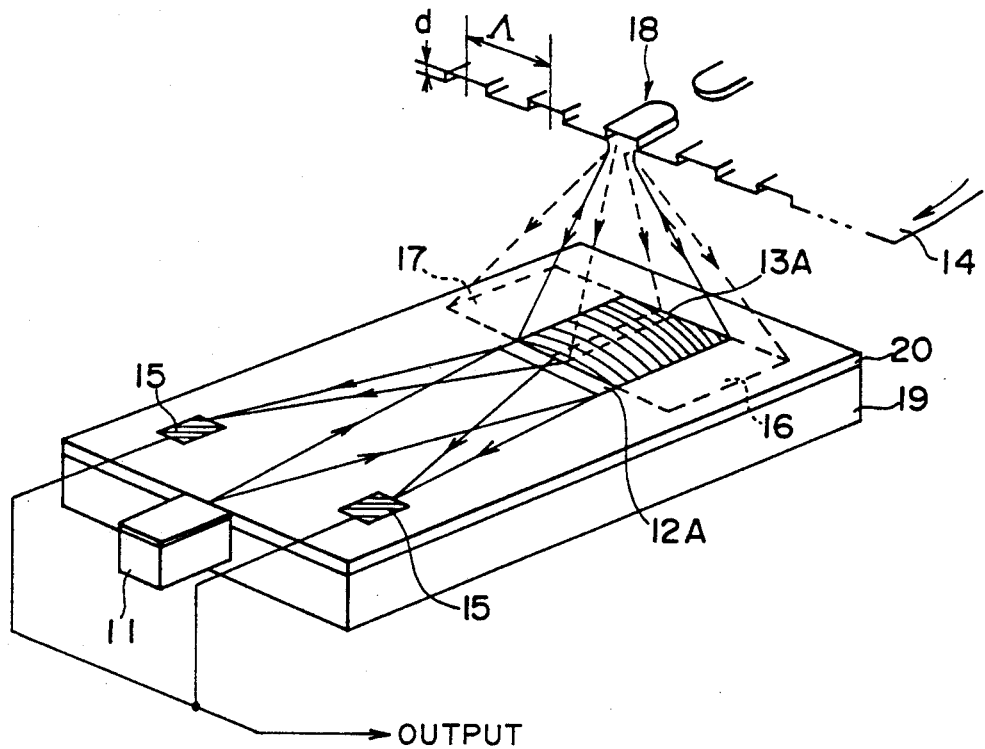
FIG. 2 is a view showing the principle of read of the pit information by a conventional integrated optical pickup.
Figure 3:
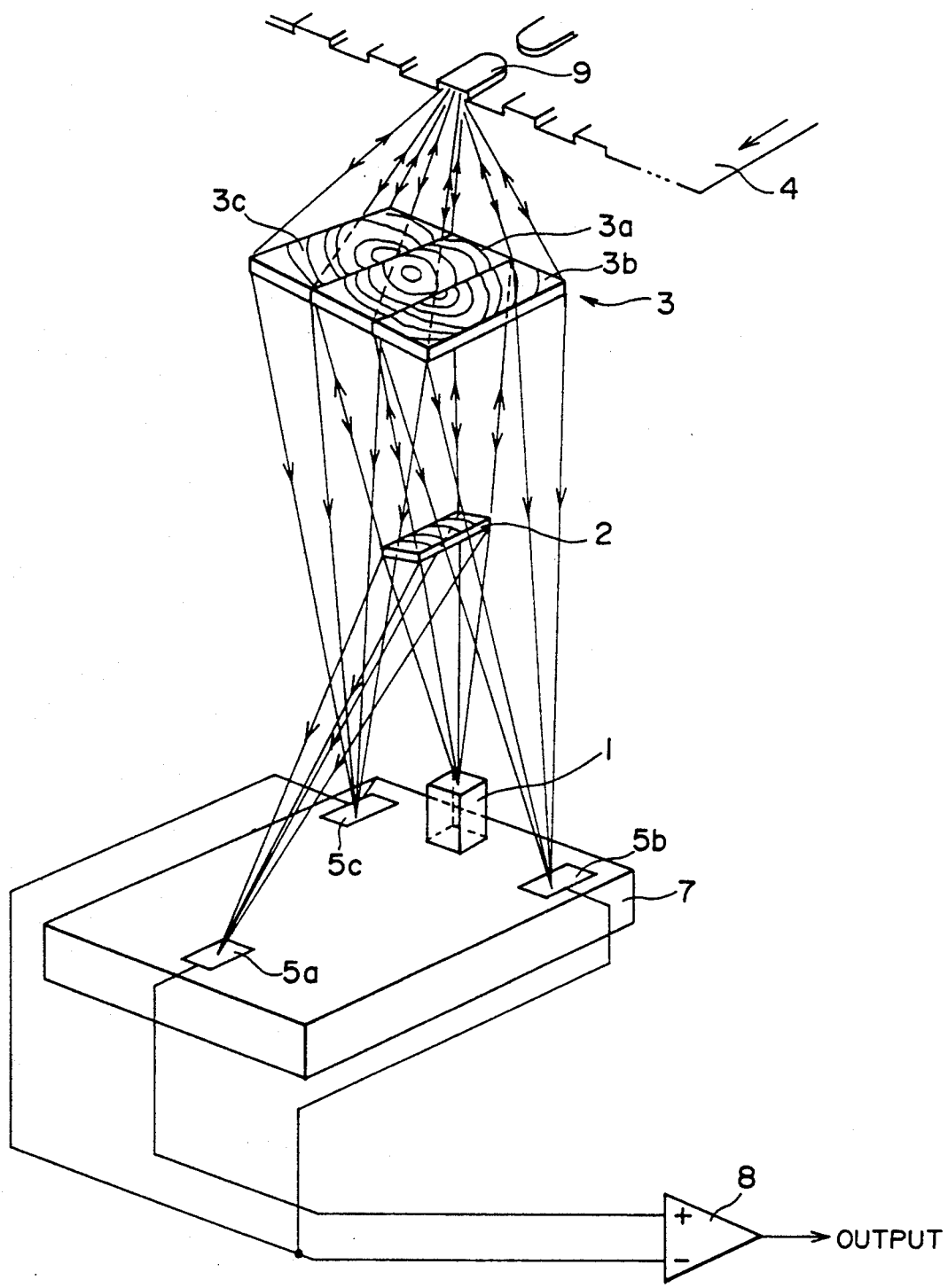
FIG. 3 shows a first embodiment of the optical pickup according to the present invention.

FIG. 3 shows a first embodiment of an optical pickup according to the present invention. The optical pickup comprises a semiconductor laser 1 and photodiodes 5a, 5b and 5c mounted on a semiconductor substrate 7, and optical path change element 2 (such as a grating beam splitter, a condenser lens 3 having a center lens portion 3a and two side lens portions 3b and 3c and a differential amplifier 8. In the figure, a light emitted from the semiconductor laser 1 is focused on a disc 4 by the center portion 3a of the lens 3. The oth order light that is reflected by the disc 4 passes once again through the center portion 3a of the lens 3, is bent by the optical path change element 2 and focused onto the photodiode 5a and becomes the oth order optical output signal. If there is a pit 9 on the disc 4, then ±1st order diffracted lights are created by the diffraction and the two side portions 3b, 3c of the lens 3 focus them onto photodiodes 5b and 5c, to become ±1st order optical output signals. The differential amplifier 8 takes the difference between the oth order optical output signal and the sum of the detected ±1st order optical output signal and reproduces the pit detection signal, that is, the information signal that is recorded on the disc.

Figure 4A:
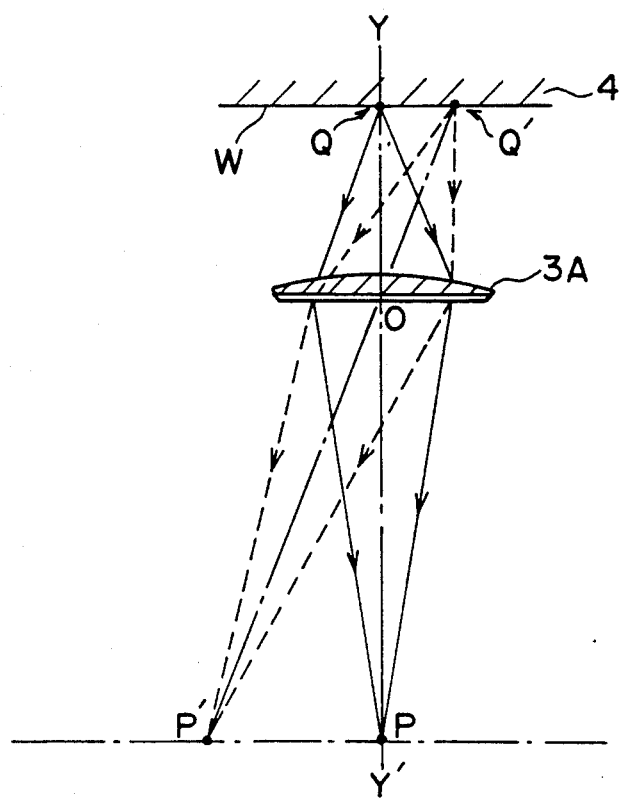
FIG. 4A is a sectional view of a lens for explaining the principle of a lens 3 used in the first embodiment.
Figure 4B:
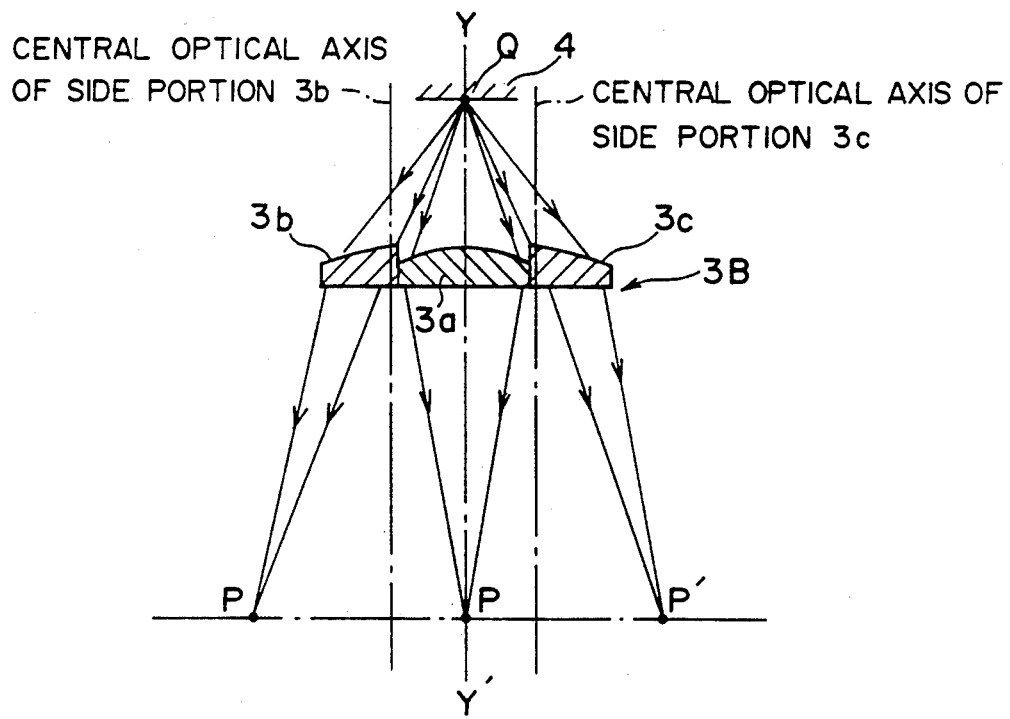
FIG. 4B is a sectional view of a composite lens for explaining the principle of a lens 3 used in the first embodiment.

The following is a description on the principle of the lens 3 used here, with reference to FIGS. 4A and 4B. FIG. 4A is a sectional view of a lens 3A. Here, Y—Y' is the central optical axis of the lens 3A, and W is the reflective surface (disc surface) of the disc 4. Furthermore, points P and Q are the conjugation points of the lens 3A. A light reflected from the point Q on the central optical axis is focused to the point P on the same axis but a light that is reflected from the point Q' outside of the central optical axis of the same reflective surface passes along a line going through the point Q' and the point 0 on the central optical axis of the lens 3, and is focused onto the point P' at the same distance as between the lens 3A and the point P. Accordingly, if a combination of the three lens portions 3a, 3b and 3c having the same curvature and different optical axes is used as a lens 3B as shown in FIG. 4B, then as shown in FIG. 3, it is possible to separate and detect the oth order light and the ±1st order lights. By selecting the curvature (focusing distance) and the central optical axis of the side lens portions 3b and 3c, it is possible to select the focusing point so as to suit the configuration of the optical pickup.

However, when a conventional lens having curved surfaces is used for this purpose, a step between both of the side lens portions 3a and 3c and the central lens portion 3a cannot be avoided. This step generates dispersion of the light and moreover, it is difficult to manufacture such a lens as shown in FIG. 4B. Accordingly, it is desirable that the lens 3 shown in FIG. 3 be configured by a grating lens which can reproduce the optical characteristics described above in the same plane.

Details of grating lenses are for example, given in D. Heitmann, et al., "Calculation and experimental verification of two-dimensional focusing grating couplers," IEEE J.Quantum Electron., QE-17, p.1257,1981 and T.Suhara, et. al, "Optical Pickup light focusing circuit", 0 plus E, no. 76, Mar. '86.

The following is a description of a second embodiment according to the present invention configured with an optical pickup with an integrated optical circuit provided with a grating lens.

The optical pickup comprises a grating beam splitter 20, a focusing grating coupler 30a, ±1st order focusing grating couplers 30b and 30c and the photodiodes 5a, 5b and 5c mounted on a light guiding layer 6 which is formed on the semiconductor substrate 7, the semiconductor laser 1 and differential amplifier 8.

A light emitted from the semiconductor laser 1 is transmitted inside the light guiding layer 6 formed on the semiconductor substrate 7, and results in a spot on the optical disc 4 by the focusing grating coupler 30a.

The oth order light reflected by the optical disc 4 is again converged by the focusing grating coupler 30a and is focused to the oth order photodiodes 5a through the grating beam splitter 20 and becomes output signals. On the other hand, the ±1st order diffracted lights created by diffraction of the pits 9 on the optical disc 4 return to the ±1st order focusing grating couplers 30b, 30c and are focused to the ±1st order photodiodes 5b and 5c and respectively becomes output signals.

Figure 6:
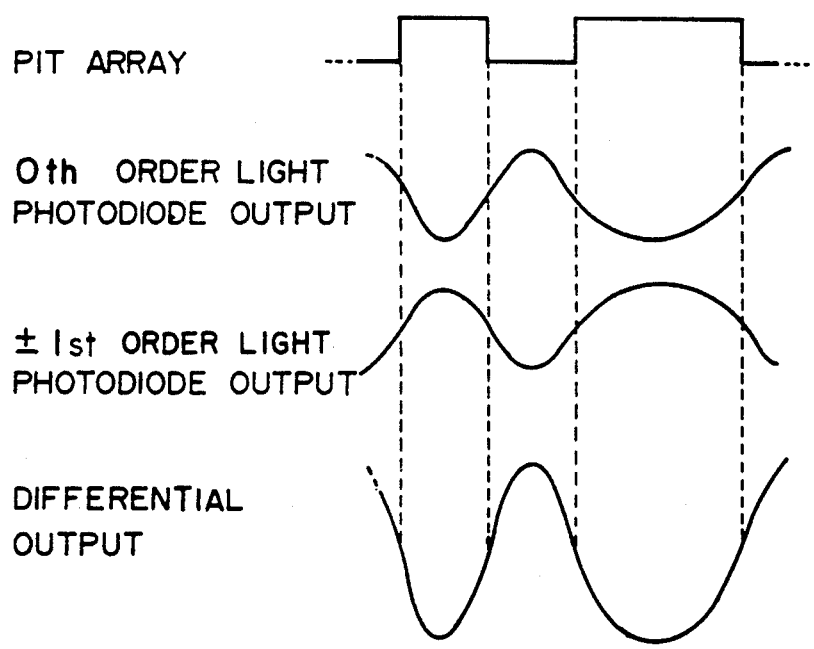
FIG. 6 is an output waveform of an optical pickup of the second embodiment.

In the optical pickup having the configuration as described above, as shown in FIG. 6, when the spot is on a pit 9, the output signals of the photodiodes 5b and 5c for ±1st order diffracted light increase because of the diffraction, and the output signal of the photodiode 5a for oth order light is relatively weak. Conversely, when the spot is not on the pit 9, the output signals of the photodiodes 5b and 5c are practically zero because there is practically no diffraction, and the output signals of the photodiode 5a becomes stronger. In this manner, the pit information appears in opposite phase to the output signal of the photodiode 5a and the output signals of the photodiodes 5b and 5c. Accordingly, performing differential (subtraction) processing by the differential amplifier 8 for both output signals enables output signals corresponding to the pit information (presence/absence of pits) to be obtained.

Moreover, the detection of focusing error and tracking error can be performed by adding, subtracting and combining the output signals of four oth order photodiodes 5a that have different detection positions, as in "Optical head apparatus" disclosed in Japanese Patent Application Laid Open Number 1986-85637 and "Optical type head apparatus" disclosed in Japanese Patent Application Laid Open Number 1986-296540.

Figure 5:
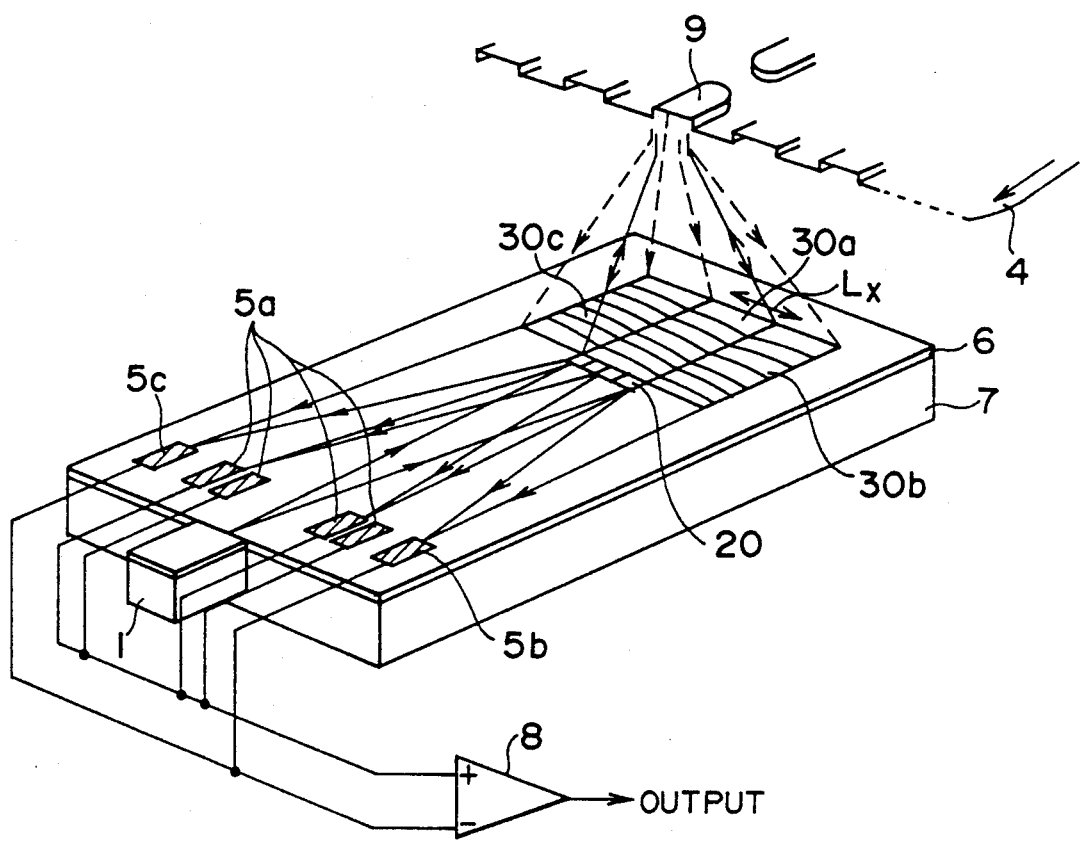
FIG. 5 shows a second embodiment of an optical pickup according to the present invention.

The following is a description of the configuration for separating and extracting the oth order light and the ±1st order diffracted light according to the pits 9 in the disc 4 and by using the lens 3 in FIG. 3 and the focusing grating couplers 30a, 30b and 30c in FIG. 5.

Figure 7A:
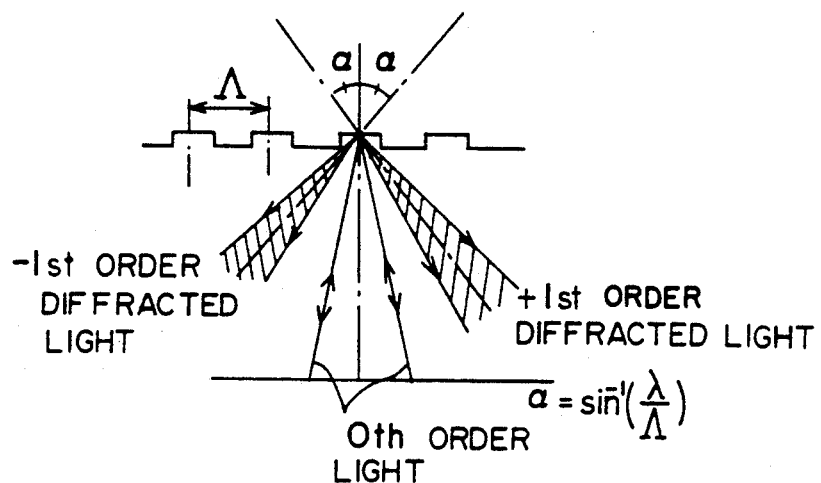
FIG. 7A and 7B are sectional views showing the principle of separating and reading the 0th order light and the ±1st order light by the optical pickup according to the present invention.

FIG. 7A shows focusing and diffraction in section which it intersects the pit array at right angles. The light that is focused on the surface of the optical disc having a pit gap (track pitch) Λ is reflected back along the same path as the oth order light and is also diffracted so that optical axes of the oth order light and the ±1st order lights are at the angle α.

When this occurs, the angle α can be expressed as $$\alpha = \sin^{-1}(\lambda/\Lambda)$$

where the light wavelength is expressed as λ.

Figure 7B:
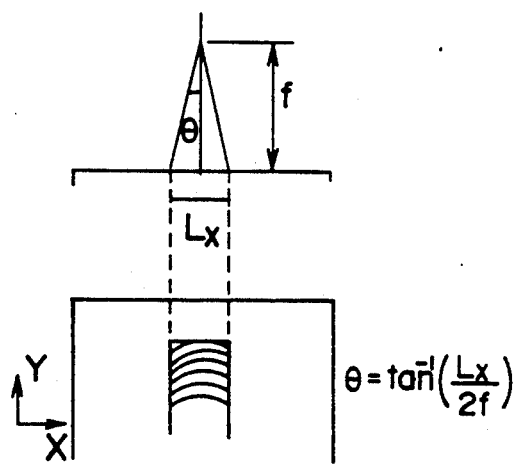

In addition, in FIG. 7B, the angle θ of focusing and dispersion of each of the light can be expressed as $$\theta \tan^{-1}(L_x/2f)$$

when the aperture of a focusing device such as the lens 3 in FIG. 3 and the focusing grating couplers 30a, 30b and 30c in FIG. 5 in the direction (radial direction) that intersects the pit array at right angles is $L_x$, and the focusing distance is f.

Accordingly, the condition that region of the ±1st order lights do not overlap the region of the oth order light is $$2\theta \leq \alpha$$

and so $$2 \tan^{-1} (L_x/2f) \leq \sin^{-1} (\lambda/\Lambda)$$

In particular, right and left sides are equal to each other, each of the regions of the oth order light and the ±1st order lights are adjacent with each other being no gap between them.

For example, with an optical disc such as a CD (compact disc) where and so $\Lambda = 1.6$ μm and so $\lambda = 780$ nm and f = 2 mm, the aperture $L_x$ can be made $$\begin{aligned} L_x &= 2f \tan \{1/2 \cdot \sin^{-1} (\lambda/\Lambda) \\ &= 1.04 \text{ mm} \end{aligned}$$

More specifically, when $L_x$ of the aperture (in the radial direction) of the focusing grating coupler 30a is approximately 1.04 mm, then the ±1st order light focusing grating couplers 30b and 30c can be disposed on either side of the focusing grating coupler 30a. If there is this configuration, then, the oth order light and the ±1st order diffracted lights are easily separated and be adjacent with each other with no gap.

Figure 8:
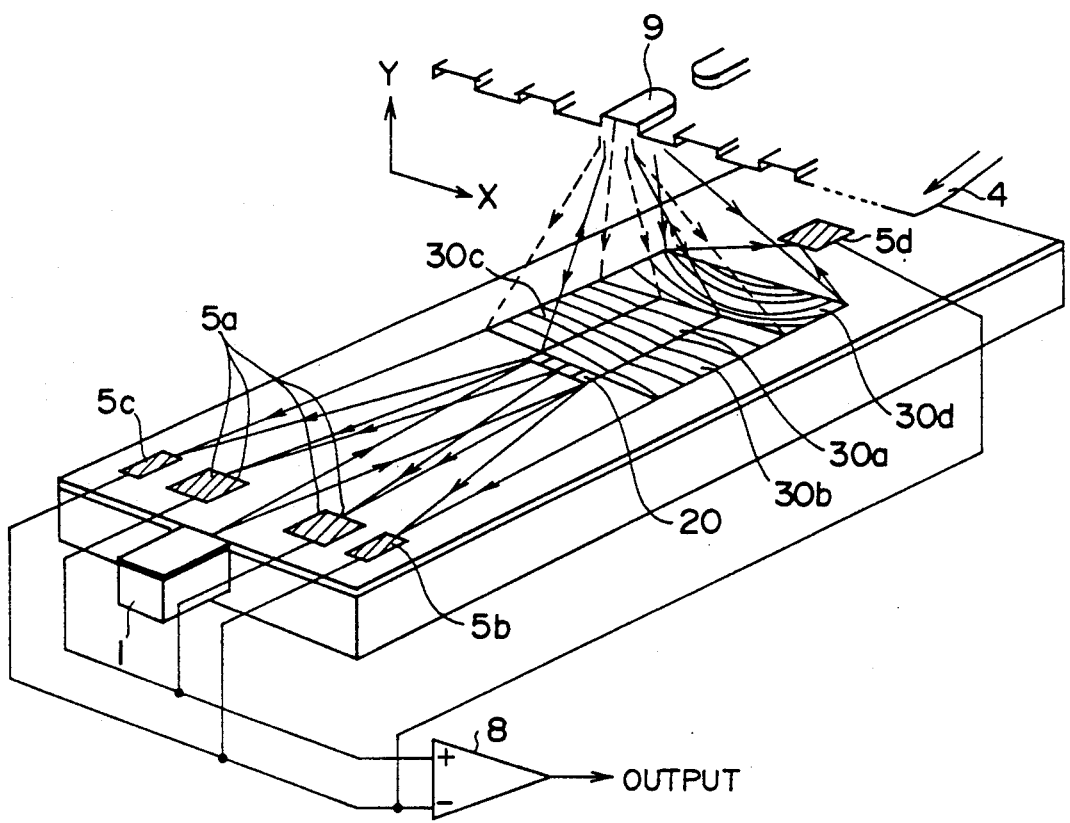
FIG. 8 shows a third embodiment of an optical pickup according to the present invention.

This configuration is only for the separation and detection of the diffracted light in the radial direction but extension of this configuration to two dimensions is possible. There are diffracted lights generated also in the direction before and after the pit, for that, FIG. 8 shows a third embodiment according to the present invention provided with a focusing device with respect to the diffracted light in the direction before and after the pits the same as that with respect to the diffracted light on both sides of the pit. At the focusing device with respect to the diffracted light in the direction before and after the pits and which is a newly provided focusing grating coupler 30d in the figure, the diffracted light that is focused, is detected by a photodiode 5d and the diffracted light signals (output of the photodiodes 5b and 5c) to the left and right directions are added to the diffracted light signal of the photodiode 5d and the difference with the oth order light taken and a pit detection signal obtained.

An optical pickup having the configuration described above has the following advantages.

The optical pickup detects practically all of the ±1st order diffracted lights by the ±1st order diffracted light focusing grating coupler 30b and 30c and also detects the difference using only the intensity ratio of the oth order reflected light and the ±1st order diffracted lights and without using the interference and so the signal intensity is increased and the symmetry of the detected waveform is improved. Accordingly, it is possible to accurately reproduce the pit information from the optical disc.

Figure 9A:
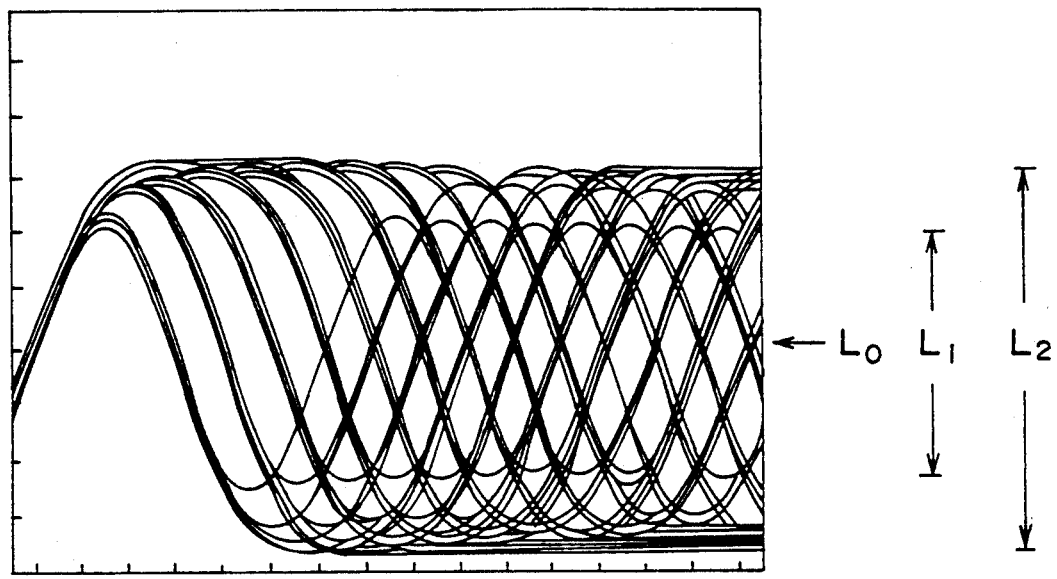
FIG. 9A and 9B are graphs comparing the output waveform of an optical pickup according to the present invention and a conventional optical pickup.
Figure 9B:
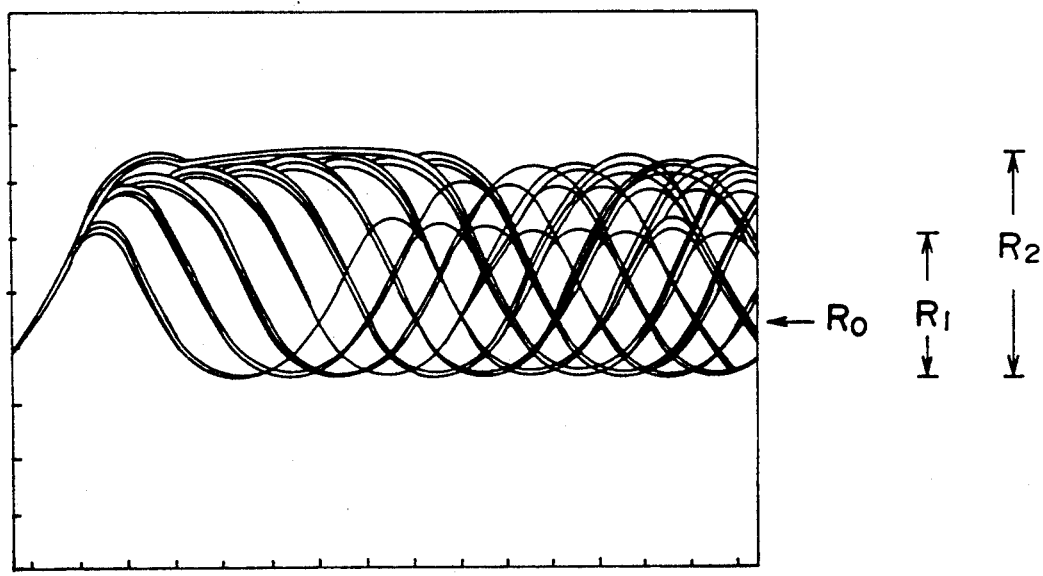

As shown in the simulation in FIG. 9A and 9B, when compared to a conventional integrated optical pickup, an optical pickup according to the present invention has a far better reproduced waveform. FIG. 9A is the reproduced waveform of the optical pickup according to the present invention, and when the pit length or the gap between pits is shortest and longest, there is a large value for the amplitude $L_1$ and the amplitude $L_2$ respectively of the reproduced waveform and both have a symmetrical amplitude change. Accordingly, the slice level can be set to the center L0 so that it is possible to demodulate the pit information with extreme accuracy. FIG. 9B is the reproduced waveform of a conventional focusing pickup, and when the pit length or the gap between pits is shortest and longest, there is a small value for the amplitude $R_1$ and the amplitude $R_2$ respectively of the reproduced waveform and the amplitude change of both is not in agreement with the central value and so it is not possible to set the slice level to the center (by positioning the slice level to the center $R_O$ of $R_1$) and so demodulation of the pit information is not easy.

With the optical pickup according to the present invention, the reproduced signal is obtained by differential detection and thus common-mode noise is suppressed and the signal to noise ratio is improved.

With the optical pickup according to the present invention, there is a small aperture (in the radial direction) of the emitted light focusing device and so the allowable manufacturing accuracy is ameliorated.

In addition, as is shown in FIG. 10, the optical pickup according to the present invention has practically minimal crosstalk between adjacent tracks when there is optimum design, that is, when there is the optimum aperture ($L_x$ is set to approximately 1.04 mm) for (compact disc) as has been described above.

FIG. 10 shows the results of analysis of the read response in an integrated disc pickup ("Optics" Vol. 18, No. 2, pages 82–90). This shows the change in the crosstalk when the aperture has been changed (in the radial direction) from 0 to 2 mm for when L is 1.6 μm and f=2 mm. The crosstalk is dependent upon the focusing characteristics in the radial direction and so the aperture $L_x$ of the (oth order) focusing grating coupler (30a) of the pickup according, to the present invention is the horizontal axis of FIG. 10. As can be seen from FIG. 10, when there is the optimum aperture (with $L_x$ set to approximately 1.04 mm) in a CD (compact disc), the crosstalk from adjacent tracks is practically minimum.

This optical pickup according to the present invention has a small aperture (in the radial direction) of the emitted light focusing device and so the laser light source position that produces the optimum intensity distribution for the emitted light in the direction perpendicular to the pit arrays (the radial direction) can be made closer to the pit arrays, and the optical pickup made more compact.

Moreover, an optical pickup according to the present invention can produce the same effect in an optical disc or an optical card of the transparent type where the information recording surface is transparent. In addition, the description of the present embodiment was given for an integrated pickup but the configuration can also use a normal lens system (having bulk type lenses and the like).

What is claimed is:

1. An optical apparatus which emits a beam of reading light to an optical information recording medium having a pit in which information is stored and reads the information by means of the zero order reflected light reflected from the pit and the diffracted light generated on the pit by diffraction effect, comprising:

light generating means for generating the beam of reading light;

first photoelectric conversion means provided so that the zero order reflected light is incident thereto for generating a first electric signal corresponding to the intensity of the zero order reflected light incident thereto;

second photoelectric conversion means provided so that the diffracted light is incident thereto for generating a second electric signal corresponding to the intensity of the diffracted light incident thereto;

light focusing and guiding means, having a first grating lens of a first central optical axis and a second grating lens of a second central optical axis unequal to the first central optical axis, the first grating lens focusing the beam of reading light on the pit, the first and second grating lenses associating with each other to separate the zero order reflected light and the diffracted light, the first grating lens guiding the zero order reflected light to the first photoelectric conversion means and the second grating lens guiding the diffracted light to the second photoelectric conversion means; and operating means for generating an output signal corresponding to the information stored in the pit by taking difference between the first and the second electric signals.

2. The apparatus according to claim 1, wherein the first and second grating lenses share an optical configuration in which an angle between an optical axis of the zero order reflected light and an optical axis of the diffracted light is equal to or larger than two times of an angle of focusing the beam of reading light on the pit with respect to an optical axis of the beam of reading light.

3. The apparatus according to claim 1, further comprising a light guiding path through which the 0th order reflected light is conducted to the first photoelectric conversion means and also the diffracted light is conducted to the second photoelectric conversion means.

4. The apparatus according to claim 3, further comprising an integrated optical circuit having a semiconductor substrate on which the light generation means, the light focusing and guiding means, the first and second photoelectric conversion means and the light guiding path are mounted.

* * * * *